United States Patent [19]

Imazeki et al.

[11] Patent Number: 4,525,738
[45] Date of Patent: Jun. 25, 1985

[54] AMPLIFIED VIDEO SIGNAL DISTRIBUTING APPARATUS

[75] Inventors: Kazuyoshi Imazeki; Hasashi Wani, both of Tokyo, Japan

[73] Assignee: General Research of Electronics, Inc., Tokyo, Japan

[21] Appl. No.: 441,500

[22] Filed: Nov. 15, 1982

[51] Int. Cl.³ .............................................. H04N 5/22
[52] U.S. Cl. ...................................... 358/181; 358/86; 358/185
[58] Field of Search ................. 358/86, 181, 185, 188, 358/189; 455/3, 133, 140, 344

[56] References Cited

U.S. PATENT DOCUMENTS

| | | | |
|---|---|---|---|
| 3,484,548 | 12/1969 | Kowal | 358/181 |
| 4,276,562 | 6/1981 | Stewart | 358/181 |
| 4,329,675 | 5/1982 | Van Hulle | 358/185 |
| 4,456,928 | 6/1984 | Guillon | 358/181 |

Primary Examiner—Tommy P. Chin
Attorney, Agent, or Firm—Trexler, Bushnell & Wolters, Ltd.

[57] ABSTRACT

An amplified video signal distributing apparatus is provided which has a plurality of input terminals. An associated plurality of input signals are applied thereto for selective application to at least one utilization device which is coupled to the output of the apparatus. The apparatus comprises a primary input terminal, a plurality of secondary input terminals, switches for selecting the signal which appears at one of the secondary input terminals, at least one output terminal, and a signal generator for generating a primary control signal and a secondary control signal. A controllable switch is responsive to the primary control signal for coupling the primary input terminal to at least one of the output terminals and is responsive to the secondary control signal for coupling the signal selected by the selecting switches to at least one of the output terminals.

6 Claims, 2 Drawing Figures

AMPLIFIED VIDEO SIGNAL DISTRIBUTING APPARATUS

BACKGROUND OF THE INVENTION

The invention is directed generally to an amplified video signal distribution apparatus and more particularly to such apparatus for selectively connecting a selected one of a plurality of inputs or source signals to both of two outputs or utilization devices.

One such amplified video signal distribution apparatus or switching device is commonly known as a video selector. In such a video selector, one or more input devices, for example a television antenna, a cable television lead, a home computer or video game, and a video tape or cassette recorder (often referred to as a "VTR" or "VCR") or video disc player may be selected for play through a television receiver or alternatively for recording information therefrom on a second VTR. While the invention is not limited thereto, the following discussion will be facilitated by specific reference to a novel and improved video selector apparatus.

Generally speaking a number of problems are encountered in devices for switching multiple inputs to multiple outputs. For example, such switching devices must make provision to properly isolate the inputs from the outputs to avoid interference therebetween. Similarly, the several inputs must be effectively isolated one from the other to avoid cross-talk or interference, while the several outputs must be similarly isolated. Additionally, it is important to transfer signals from a selected input to one or more outputs substantially without adding any distortion, noise or the like to the input signal, while at the same time minimizing any signal loss.

In addition to the foregoing considerations, it is desirable to minimize the cost of such a switching device so as to make it attractive to a relatively broad market. Heretofore, it has proven difficult to provide a switching device or video selector which meets the foregoing performance requirements at an acceptable cost.

OBJECTS AND SUMMARY OF THE INVENTION

Accordingly, it is a general object of this invention to provide a novel and improved amplified video signal distributing apparatus.

A more specific object is to provide such an amplified video signal distributing apparatus which substantially avoids the problems of interference, cross-talk, distortion and input losses discussed above.

A further object is to provide an amplified video signal distributing apparatus in accordance with the foregoing objects which is relatively simple and inexpensive in its design and manufacture and yet highly reliable in operation.

Briefly, and in accordance with the foregoing objects, an amplified video signal distributing apparatus in accordance with the invention comprises a first input terminal, a plurality of second input terminals, at least one output terminal, controllable switching means for normally coupling said primary input terminal with said output terminal and responsive to a predetermined control signal for coupling a selected one of said plurality of second input terminals with said output terminal, first switch means for selectively applying said predetermined control signal to said controllable switching means, and second switch means for selectively and individually coupling each of said plurality of second input terminals to said controllable switching means for coupling with said output terminal.

BRIEF DESCRIPTION OF THE DRAWINGS

The foregoing as well as other objects, features and advantages of the present invention will be more readily appreciated upon reading the following detailed description of the illustrated embodiment, together with reference to the drawings, wherein.

DETAILED DESCRIPTION OF THE ILLUSTRATED EMBODIMENT

While the present invention is not limited thereto, the description will be hereinafter facilitated by specific reference to an amplified video selector apparatus.

Figure 1:
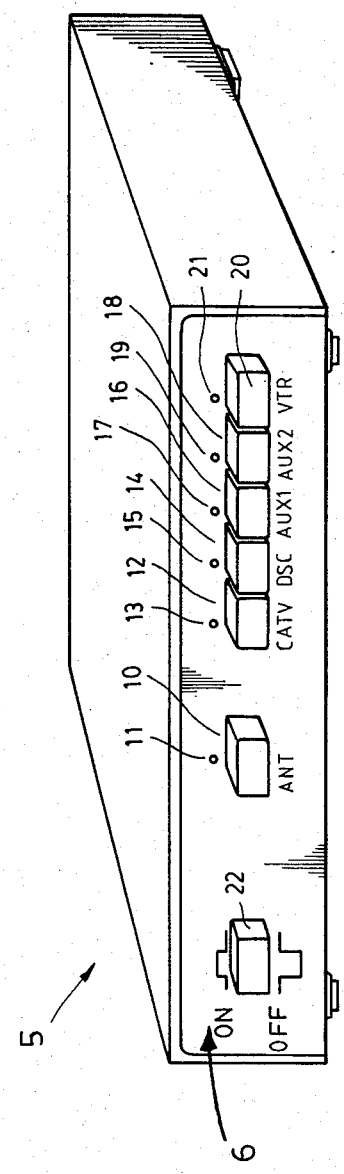
FIG. 1 is a perspective view of an amplified video signal distributing apparatus in accordance with the present invention, particularly illustrating the front panel controls thereof.

Referring now to the drawings and initially of FIG. 1, an amplified video signal distributing apparatus or video selector in accordance with the invention is designated generally by the reference numeral 5. A front control panel 6 of the apparatus 5 includes suitable control elements for effecting switching signals from one of a plurality of input devices to both of a pair of output utilization devices.

In the illustrated embodiemnt, the control panel 6 includes seven push-button switches 10, 12, 14, 16, 18 and 20. Associated with each of these switches is a corresponding one of a plurality of suitable LED indicators 11, 13, 15, 17, 19 and 21 to indicate whether the associated switch is in an active or inactive state; that is, whether the corresponding input device has been selected and coupled to the output or utilization devices.

In this latter regard, the switch 10 is coupled to select a television antenna ("ANT"), the switch 12 is coupled to select a cable television lead ("CATV") the switch 14 is coupled to select a video disc player ("DISC") and the switch 20 is coupled to select a video tape or cassette recorder ("VTR"). The remaining two switches 16 and 18 are coupled to select auxiliarly terminals to which any additional desired auxiliary device (such as a home computer or video game or the like) may be coupled, and hence are labeled "AUX1" and "AUX2".

Additionally, a suitable power on/off switch 22 is provided for energizing and de-energizing the switching apparatus.

Figure 2:
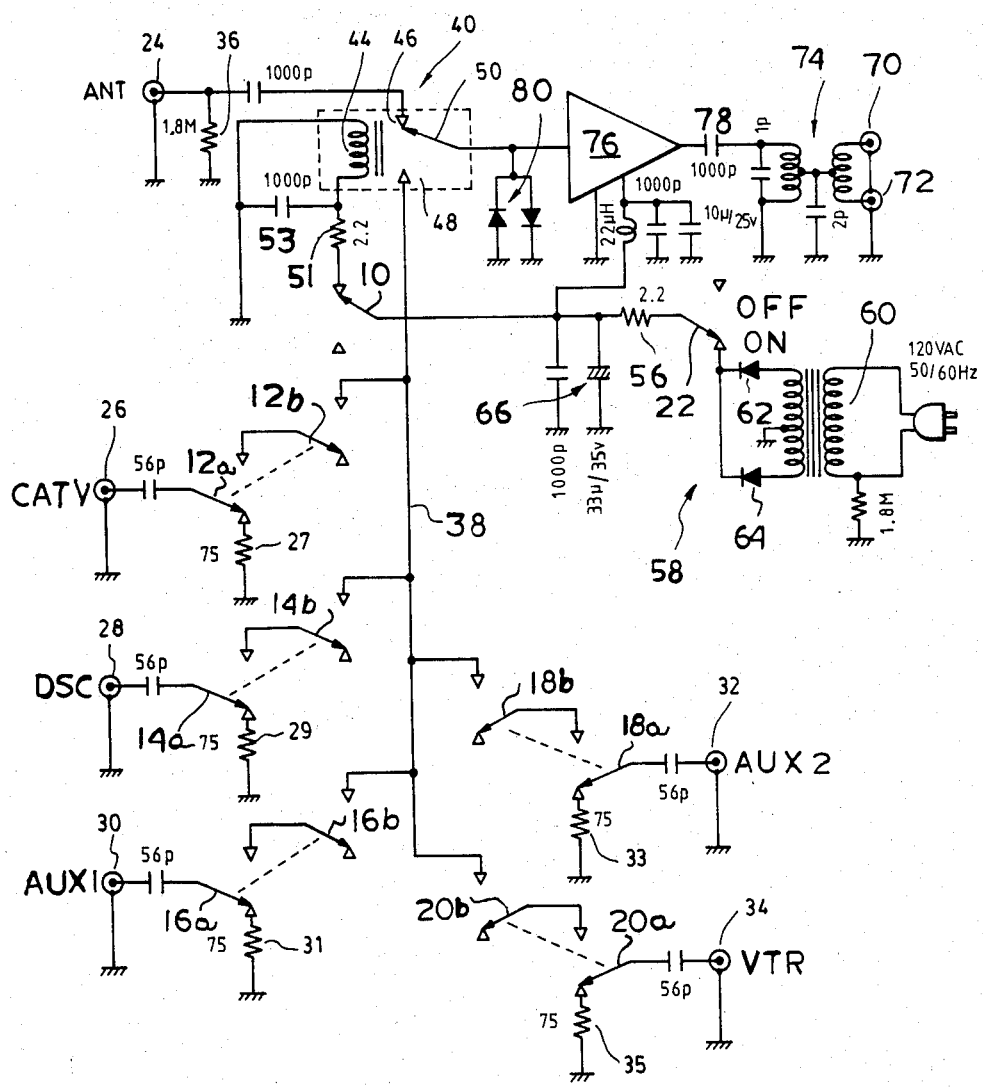
FIG. 2 is a circuit schematic diagram of the amplified video signal distributing apparatus according to the invention.

Reference is next invited to FIG. 2, wherein the details of the apparatus controlled by the switches shown on the front panel of the device shown in FIG. 1 are illustrated in schematic diagram from. Initially, it is noted that a plurality of input terminals are provided for respectively receiving the signals from the various input devices discussed above with reference to the switches 10, 12, etc., of the front panel 6 of the device illustrated in FIG. 1. In this regard, a first or primary input terminal 24 is provided to receive an antenna ("ANT") signal. Similarly, a plurality of secondary input terminals are provided to receive signals from the remaining devices discussed above. Hence an input terminal 26 is provided to receive the signal from a cable television line ("CATV"), an input terminal 28 is provided to receive the signal from a video disc player ("DISC")

and an input terminal 44 is provided to receive the signal from a video tape or cassette recorder ("VTR"). Two remaining input terminals 30 and 32 are auxiliary inputs designated as "AUX1" and "AUX2" for receiving signals from additional sources or devices as discussed above.

In accordance with the illustrated embodiment of the present invention, each of these input terminals is provided with a suitable coupling capacitor, preferably having a value on the order of 56 pf. These coupling capacitors feed respective first movable contactors of the respective switches 12, 14, etc. It will be seen that each of these switches 12, 14, etc., comprises a pair of similar movable contactors designated by suffixes a and b, which are mechanically connected to operate in unison. A first of each of these movable contactors is coupled to its respective input terminal by way of a suitable coupling capacitor as described above and is movable between a first contact provided with a line termination impedance 27, 29, 31, 33, 35 (preferably on the order of 75 ohms) and a second contact which is coupled with the associated second movable contactor. Each of the second movable contactors is movable between a first, floating contact and a second contact which is coupled with a buss line 38 to be described later.

The antenna input terminal 24 ("ANT") is provided with a suitable impedance-matching resistor 36 to ground, preferably having a value of approximately 1.8 megohms, and a suitable coupling capacitor which preferably has a value of approximately 1,000 pf. This coupling capacitor feeds one contact 46 of a relay designated generally by the reference numeral 40. A second contact 48 of this relay 40 is coupled with the above-mentioned buss line 38. The relay 40 also includes a movable contactor 50 which is responsive to energization and de-energization of a relay coil 44 for making electrical contact with one or the other of the two relay contacts 46, 48. The relay coil 44 is in turn energized and de-energized by operation of the switch 10 which will be seen to comprise a single-pole, double-throw switch. A suitable current-limiting resistor 51 and a parallel capacitor 53 are also provided for the relay coil 44. Switch 10 provides a first control signal when it is in the closed position (i.e. the pole is connected to resistor 51) and provides a second control signal when it is in the opposite position. These first and second control signals determine the operation of the controllable switching means, relay 44.

The movable contactor of the switch 10 is coupled by way of a suitable current-limiting resistor 56 to the movable contactor of the power on/off switch 22 which in turn selectively receives the output of a suitable power supply 58. In the illustrated embodiment, power supply 58 comprises a transformer 60 which is coupled to a conventional 120-volt AC 60 Hz source and provides substantially 35-volts AC across its center-tapped secondary. Suitable rectifiers 62 and 64 enable full-wave rectification, and a suitable 33 mf/35 V filter capacitor 66 and an RF by pass 1,000 pf capacitor are provided at the junction of the switch 10 with the current-limiting resistor 56.

Referring now to the output side of the circuit, a pair of output terminals 70, 72 preferably comprise coaxial-type connectors. In accordance with a feature of the invention, output terminals 70 and 72 are fed from a balanced line provided by a suitable impedance-matching element which in the embodiment of the invention illustrated in FIG. 2 comprises a balun coil 74. Balun coil 74 is illustrated here with a parallel equivalent input capacitance of on the order of 1 pf and distributed capacitance of on the order of 2 pf.

The input side of balun coil 74 receives the signal selected by operation of the relay 40 by way of a suitable isolating amplifier 76. In the illustrated embodiment, amplifier 77 comprises an IC booster amplifier of the type generally designated SL565C. Preferably, a coupling capacitor 78 is utilized between the output of the amplifier 76 and the input of the balun coil 74. Additionally, the input to the amplifier 76 is provided with a pair of back-to-back grounded diodes 80 for protecting the input of amplifier 76 from unusually high signal levels. Suitable DC power for the amplifier 76 is obtained from the power supply 58 by way of a 22 mH filter coil and this DC power input is also provided with a 10 mH/25 V filter capacitor and a 1000 of RF bypass capacitor.

In accordance with a further preferred feature of the invention, the respective switches 12, 14, 16, 18 and 20 are mechanically interconnected so that one and only one of these switches may be in contact with the buss line 38 at any given time. Hence, upon depression of any of the corresponding push-buttons on the front panel 6 of the device shown in FIG. 1, the others of these push-buttons will be mechanically disengaged. In other words, the "a" contactors thereof will be moved to the position illustrated in FIG. 2, for terminating the associated input line at the associated termination impedance elements 27, 29, 31, 33, 35. While the respective switches 12, 14, etc., have been illustrated schematically in FIG. 2, it will be understood that a suitable switching device such as a rotary switch may be utilized to perform the functions of these switches as illustrated and described above.

In operation, relay coil 14 is energized when both the power on/off switch is placed in its "on" position and the antenna control switch 10 is in its depressed or active position. Upon energization of relay coil 44, the movable relay contactor 50 is energized into contact with the first relay contact 46 for coupling the antenna input signals from the isolating amplifier 76 and balun coil 74 to the balanced line output feeding both output terminals 70 and 72. Hence, the antenna input 24 may be said to be the primary or normally selected input.

Consequently, when the antenna selector switch 10 is moved to its second or inactive state, selection of any of the other input signals may be undertaken. In this regard, such movement of the switch 10 to its contact position opposite that illustrated in FIG. 2 will effectively de-energize relay 40, returning the movable contactor 50 to a position in electrical contact with the second relay contact 48. Since this second relay contact 48 is fed from the buss line 38, subsequent depression of any one of the switches 12, 14, etc., will feed the associated input signal to the second relay contact 48 and hence to the movable contactor 50 to be fed through the amplifier 76 and the balun coil 74 to the balanced line feeding the output terminals 70 and 72.

Advantageously, the above-described circuit effectively isolates the plural inputs thereof one from another to substantially eliminate any cross-talk or other interference therebetween. Additionally, the provision of a balanced line output by the balun coil 74 assures that a substantially identical signal is fed to both output terminals 70, 72 without cross-talk or interference therebetween. In this regard, the output terminals 70 and 72 may respectively feed utilization devices such as a television monitor and a second video tape or cassette recorder. Additionally, the provision of the isolating amplifier 76 effectively isolates the selected input from the outputs and moreover this amplifier 76 and the balun coil 76 substantially eliminate any input signal losses.

While particular embodiments of this invention have been shown and described in detail, it will be obvious to those skilled in the art that changes and modifications of the present invention, in its various aspects, may be made without departing from the invention in its broader aspects, some of which changes and modifications being matters of routine engineering or design and others being apparent only after study. As such, the scope of the invention should not be limited by the particular embodiment and specific construction described herein but should be defined by the appended claims, and equivalents thereof. Accordingly, the aim of the appended claims is to cover all such changes and modifications as fall within the true spirit and scope of the invention.

The invention is claimed as follows:

1. An amplified video signal distributing apparatus comprising: a primary input terminal; a plurality of secondary input terminals, means for selecting an input signal appearing at one of said secondary input terminals; at least one output terminal; control signal generating means for generating a primary control signal and a secondary control signal; controllable switchable means responsive to said primary control signal for coupling said primary input terminal to at least one of said output terminals and responsive to said secondary control signal for coupling the input signal selected by said selecting means to said at least one output terminal; wherein said controllable switching means comprises a relay having a first contact coupled to said primary input terminal and a second contact coupled to said selecting means, a movable contactor for coupling one of said first and second contacts in circuit with said at least one output terminal, relay coil means and coil energizing means, said coil means being operative for placing said movable contactor in electrical contact with said first contact when energized and for placing said movable contactor in electrical circuit with said second contact when de-energized; said control signal generating means comprising a switch coupled between said relay coil means and said coil energizing means for selectively energizing and de-energizing said relay coil means; and wherein said selecting means comprises a plurality of switching elements respectively coupled intermediate said plurality of secondary input terminals and said second relay contact for selectively coupling the input signal from any one of said secondary input terminals to said second relay contact; and further including a line terminating impedance element associated with each of said plurality of secondary input terminals; and wherein said plurality of switching elements are mechanically interconnected for coupling only one of said plurality of secondary input terminals to said second relay contact at a time and for coupling each of the remaining ones of said plurality of secondary input terminals to the associated line-terminating impedance element.

2. An amplified video signal distributing apparatus comprising: a primary input terminal; a plurality of secondary input terminals; means for selecting an input signal appearing at one of said secondary input terminals; at least one output terminal; control signal generating means for generating a primary control signal and a secondary control signal; controllable switching means responsive to said primary control signal for coupling said primary input terminal to at least one of said output terminals and responsive to said secondary control signal for coupling the input signal selected by said selecting means to said at least one output terminal; wherein said controllable switching means comprises a relay having a first contact coupled to said primary input terminal and a second contact coupled to said selecting means, a movable connector for coupling one of said first and second contacts in circuit with said at least one output terminal, relay coil means and coil energizing means, said coil means being operative for placing said movable contactor in electrical contact with said first contact when energized and for placing said movable contactor in electrical contact with said second contact when de-energized; said control signal generating means comprising a switch coupled between said relay coil means and said coil energizing means for selectively energizing and de-energizing said relay coil; switching elements respectively coupled intermediate said plurality of secondary input terminals and said second relay contact for selectively coupling the input signal from any one of said secondary input terminals to said second relay contact; and further including a line terminating impedance element associated with each of said plurality of secondary input terminals; and wherein said selecting means further includes a second plurality of switching elements respectively coupled with said first plurality of switching elements for selectively coupling each associated one of said plurality of secondary input terminals to one of said second relay contact or the associated line-terminating impedance element.

3. Apparatus according to claim 1 or claim 2 wherein said at least one output terminal comprises two output terminals, and which further includes balanced coupling means interposed between said controllable switching means and said two output terminals for providing a balanced line to said two output terminals.

4. Apparatus according to claim 3 wherein said balanced coupling means comprises a balun coil.

5. Apparatus according to claim 4, which further include isolating means coupled between said coupling means and said controllable switching means for isolating the signal selected by said controllable switching means from said output terminals.

6. Apparatus according to claim 5 wherein said isolating means comprises a wide-band amplifier.

* * * * *